United States Patent [19]
Inomata et al.

[11] Patent Number: 5,401,557
[45] Date of Patent: Mar. 28, 1995

[54] THREAD-REINFORCED PAPER SHEET AND THREAD-REINFORCED GUMMED TAPE

[75] Inventors: Kazuo Inomata, Kamakura; Kenichi Imabori, Numazu; Masao Kogure, Kitaadachi, all of Japan

[73] Assignees: Nitivy Co., Ltd.; TEC Electronics Corporation; Lintec Corporation, all of Tokyo, Japan

[21] Appl. No.: 104,050

[22] PCT Filed: Jun. 29, 1993

[86] PCT No.: PCT/JP93/00892

§ 371 Date: Aug. 17, 1993

§ 102(e) Date: Aug. 17, 1993

[87] PCT Pub. No.: WO94/02317

PCT Pub. Date: Feb. 3, 1994

[30] Foreign Application Priority Data

Jul. 17, 1992 [JP] Japan .................................. 4-213788

[51] Int. Cl.⁶ ................................................. B32B 5/12
[52] U.S. Cl. ................................ 428/110; 428/154; 428/294; 428/350; 428/354; 428/535
[58] Field of Search ............... 428/110, 111, 154, 247, 428/249, 350, 354, 535, 294

[56] References Cited

U.S. PATENT DOCUMENTS

| | | | |
|---|---|---|---|
| 4,578,302 | 3/1986 | Schmidt et al. | 428/110 |
| 4,726,977 | 2/1988 | Goldstein et al. | 428/154 |
| 4,731,276 | 3/1988 | Manning et al. | 428/110 |

FOREIGN PATENT DOCUMENTS 2-80478  3/1990 Japan .
2-282066 11/1990 Japan .

*Primary Examiner*—James J. Bell
*Attorney, Agent, or Firm*—Armstrong, Westerman, Hattori, McLeland & Naughton

[57] ABSTRACT

A thread-reinforced paper sheet comprises upper and lower paper layers and a reinforcing thread interposed therebetween. A thread-reinforced gummed tape comprises a tape base material which consists of upper and lower paper layers and a reinforcing thread interposed between the upper and lower paper layers, and a moisture activated adhesive layer formed on one of surfaces of the tape base material. In each of the thread-reinforced paper sheet and the thread-reinforced gummed tape, a water-soluble or water-dispersible adhesive is used to laminate the upper and lower paper layers, and a water-soluble thread is used as the reinforcing thread. Each of such thread-reinforced paper sheet and such thread-reinforced gummed tape exhibits a strength equivalent to that of the prior art article and moreover, has a complete disintegratability. Thus, a regeneratable thread-reinforced paper sheet as well as a regeneratable thread-reinforced gummed tape is provided.

2 Claims, 2 Drawing Sheets

THREAD-REINFORCED PAPER SHEET AND THREAD-REINFORCED GUMMED TAPE

TECHNICAL FIELD

The present invention relates to a regeneratable thread-reinforced paper sheet, and a regeneratable thread-reinforced gummed tape made by utilizing the thread-reinforced paper sheet.

BACKGROUND ART

A paper sheet has been conventionally used as a packaging material or a base material for a gummed tape or the like. Especially, in an application requiring a strength, a thread-inserted paper sheet reinforced with a reinforcing thread is used.

For example, conventionally known thread-reinforced paper sheets used as a packaging paper sheet suitable for use, for example, in wrapping of a steel and as a fiber packaging bag, include those comprising upper and lower paper layers formed of a kraft paper or the like, and a reinforcing thread of glass, vinylon or the like interposed between the upper and lower paper layers.

In addition, conventionally known thread-reinforced gummed tapes include those having a moisture activated adhesive layer provided on one of surfaces of a tape base material which comprises an upper paper layer formed of, for example, "Clupak" paper, a lower paper layer formed of a kraft paper, and a reinforcing thread of glass, polyester, vinylon, nylon or the like interposed between the upper and lower paper layers.

However, the above prior art thread-reinforced paper sheet is accompanied by the following disadvantage: When the paper sheet is to be disintegrated with an aqueous alkali solution for regeneration, the upper and lower paper layers can be disintegrated without any problem, because they are soluble in water. However, both of an atactic polyolefin-based adhesive commonly used for laminating the upper and lower paper layers together and the reinforcing thread cannot be satisfactorily disintegrated. For this reason, when the used thread-reinforced paper sheet is to be regenerated, it is necessary to remove the reinforcing thread, resulting in a troublesome regenerating operation.

On the other hand, the above prior art thread-reinforced gummed tape is also accompanied by the following disadvantage: When the gummed tape is to be disintegrated with an aqueous alkali solution, the upper and lower paper layers constituting the tape base material and the moisture activated adhesive layer can be disintegrated without any problem, because they are soluble in water. However, both of a vinyl acetate emulsion-based adhesive commonly used for laminating the upper and lower paper layers and the reinforcing thread cannot satisfactorily disintegrated. For this reason, when a corrugated fibreboard case sealed using the thread-reinforced gummed tape or the like is to be regenerated, it is necessary to remove the gummed tape individually, resulting in a troublesome regenerating operation.

Thereupon, it is desired to propose a thread-reinforced paper sheet and a thread-reinforced gummed tape which are capable of being regenerated, as are a paper sheet and a gummed tape which are not reinforced with a reinforcing thread.

Accordingly, it is an object of the present invention to provide a regeneratable thread-reinforced paper sheet and a regeneratable thread-reinforced gummed tape to meet such demand.

DISCLOSURE OF THE INVENTION

To achieve the above object, according to the present invention, there is provided a thread-reinforced paper sheet comprising upper and lower paper layers, and a reinforcing thread interposed between the upper and lower paper layers, wherein the upper and lower paper layers are laminated to each other by using a water-soluble or water-dispersible adhesive, and the reinforcing thread used is a water-soluble thread.

In addition, according to the present invention, there is provided a thread-reinforced gummed tape comprising a tape base material which consists of upper and lower paper layers and a reinforcing thread interposed between the upper and lower paper layers, and a moisture activated adhesive layer formed on one of surfaces of the tape base material, wherein the upper and lower paper layers are laminated to each other by using a water-soluble or water-dispersible adhesive, and the reinforcing thread used is a water-soluble thread.

A kraft paper, "Clupak" paper, a crape paper or the like may be used to form the upper paper layer, and a kraft paper or the like may be used to form the lower paper layer.

The laminating adhesives which can be used include vinyl acetate-based adhesives having a water-dispersibility higher than that of the conventional vinyl acetate-based adhesive, e.g., Mowinyl 520 (made by HOECHST GOSEI Corp.) and SAIVINOL RM-1 (made by SAIDEN CHEMICAL INDUSTRY Co.) as well as water-soluble adhesives comprising water-soluble resins such as polyacrylamide, polyacrylic acid and polyacrylic ester; water-soluble pressure sensitive adhesives such as a copolymer of an acrylic ester and a monomer having a carboxyl or hydroxyl group, and a mixture of polyethylene imine and polyvinyl alcohol; and water-soluble hot melt adhesives such as a mixture of polyvinyl alcohol and a plasticizer, water-soluble polyurethane, polyvinyl pyrrolidone, polyethylene oxide and the like.

The reinforcing threads which can be used include threads made from a carboxymethyl cellulose fiber, a cation-dyable polyester fiber, an alginic fiber, a polyvinyl alcohol-based thread which can be dissolved, for example, in a warm water at 70° C., and a water-soluble threads, e.g., Solvron SL type (made by Nitivy Co., LTD.), but from a viewpoint of industrialization, a water-soluble thread made of a polyvinyl alcohol-based fiber is preferred. Particularly, it is preferable to use a water-soluble thread such as the above-described Solvron SL type, made from a polyvinyl alcohol-based fiber which has a dissolving temperature of at least 70° C. and a tensile strength of at least 3.5 g/d and which is produced by spinning of a polyvinyl alcohol having a saponification rate of at least 94 Mol % and a polymerization degree of 1,000 to 3,000. In this case, the spinning method may be any of a wet type, a semi-melting type and a dry type, although it is particularly not limited to these types.

It should be noted that a thread of a type which has a lower grade, for example, which can be dissolved at ambient temperature, may be not preferred in some cases, because it may be dissolved in water contained in an adhesive for laminating the upper and lower paper layers to each other, resulting in a reduced function as a reinforcing thread.

For the thread-reinforced gummed tape, examples of the adhesive used to form the moisture activated adhesive layer are water-soluble adhesives such as polyacrylamide, polyacrylic acid, polyacrylic esters, polyvinyl alcohol, polyvinyl ethers, cellulose derivatives, a processed starch, a glue and the like.

Unlike the adhesive for laminating the upper and lower paper layers, which is an insoluble component in the prior art thread-reinforced paper sheet or the adhesive for laminating the upper and lower layer papers and the reinforcing thread which are insoluble components in the prior art thread-reinforced gummed tape, both of the adhesive and the reinforcing thread used in the thread-reinforced paper sheet and the thread-reinforced gummed tape according to the present invention are water-soluble or water-dispersible. Therefore, the entire thread-reinforced paper sheet and the entire thread-reinforced gummed tape have an excellent disintegratability and can be regenerated.

BEST MODE FOR CARRYING OUT THE INVENTION

Figure 1:
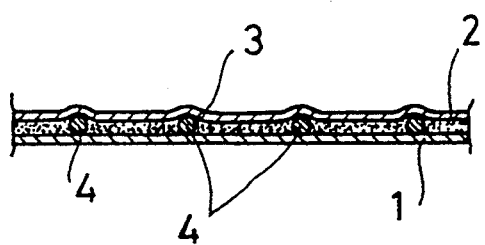
FIG. 1 is a sectional view of a preferred embodiment of a thread-reinforced paper sheet according to the present invention.
Figure 2:
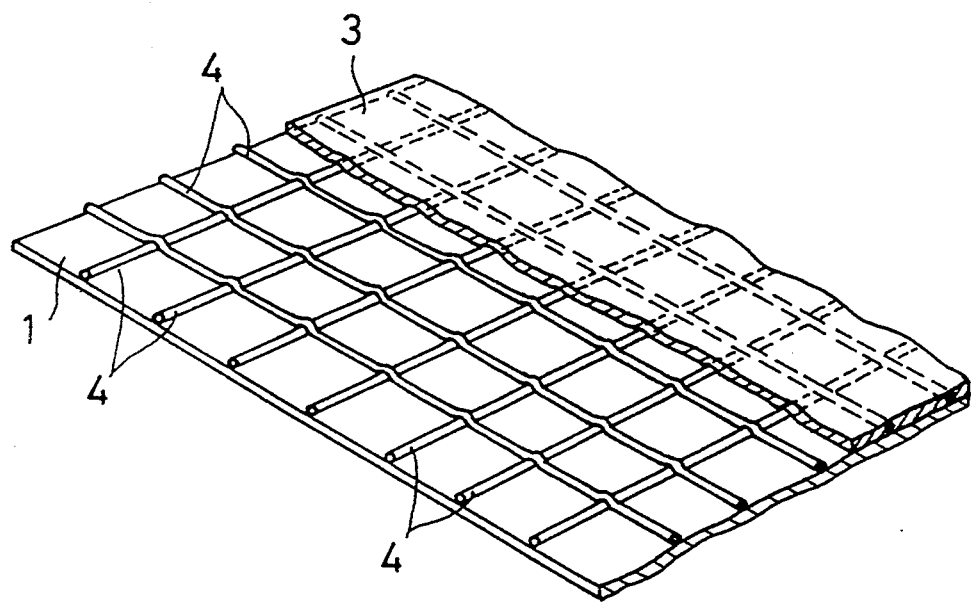
FIG. 2 is a partially cutaway perspective view of the thread-reinforced paper sheet shown in FIG. 1, with a laminating adhesive not shown.
Figure 3:
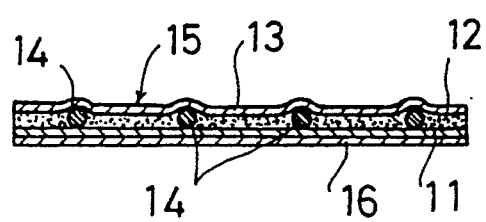
FIG. 3 is a sectional view of a preferred embodiment of a thread-reinforced gummed tape according to the present invention.
Figure 4:
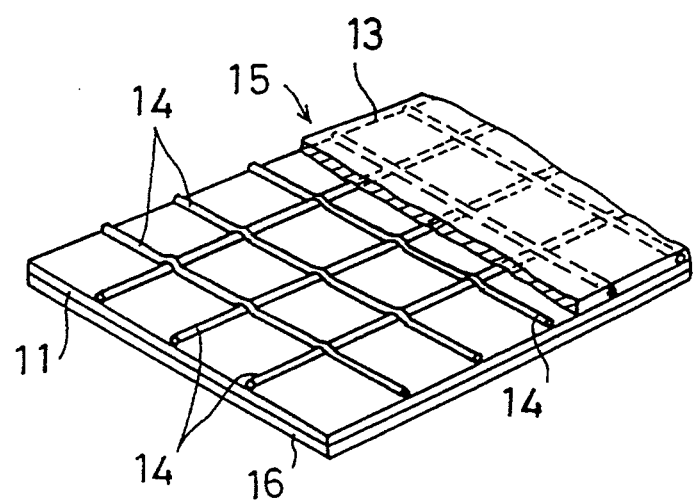
FIG. 4 is a partially cutaway perspective view of the thread-reinforced gummed tape shown in FIG. 3, with a laminating adhesive not shown.

The present invention will now be described by way of preferred embodiments of a thread-reinforced paper sheet and a thread-reinforced gummed tape in connection with the accompanying drawings.

EXAMPLE 1

A piece of kraft paper (75 g/m$^2$) was prepared for a lower paper layer 1. A vinyl acetate emulsion (Mowinyl 520) was applied as a laminating adhesive 2 onto the lower paper layer 1, so that it amounted to 25 g/m$^2$ in the terms of a solid. Water-soluble reinforcing threads (Solvron SL type) 4 made from a polyvinyl alcohol fiber having a dissolving temperature of 70° C. and a tensile strength of 4.0 g/d and produced from a polyvinyl alcohol having a polymerization degree of 1,200 and a saponification rate of 95 Mol % were placed onto a top surface of the adhesive at distances of 10 mm in longitudinal and lateral directions, and further, a piece of kraft paper (75 g/m$^2$) was placed thereon to form an upper paper layer 3. The resulting material was subjected to a press drying to fabricate a thread-reinforced paper sheet.

COMPARATIVE EXAMPLE 1

A piece of kraft paper (75 g/m$^2$) was prepared as a lower paper layer. An atactic polypropylene was applied as a laminating adhesive onto the lower paper layer, so that it amounted to 25 g/m$^2$ in the terms of a solid. Vinylon threads (10 counts) were placed onto a top surface of the adhesive at distances of 10 mm in longitudinal and lateral directions, and further, a piece of kraft paper (75 g/m$^2$) was placed thereon to form an upper paper layer. The resulting material was subjected to a press drying to fabricate a thread-reinforced paper sheet.

EXAMPLE 2

A piece of kraft paper (50 g/m$^2$) was prepared as a lower paper layer 11. A vinyl acetate emulsion (Mowinyl 520) was applied as a laminating adhesive 12 onto the lower paper layer 11, so that it amounted to 20 g/m$^2$ in the terms of a solid. Water-soluble reinforcing threads (Solvron SL type) 14 were placed onto a top surface of the adhesive at distances of 10 mm in width-wise and flow-wise directions, and further, a piece of "Culpak" paper (50 g/m$^2$) was placed thereon to form an upper paper layer 13. The resulting material was subjected to a press drying to provide a thread-reinforced tape base material 15. A gummed tape moisture activated adhesive (a mixture of dextrin and polyacrylic acid) 16 was applied onto the tape base material 15 in an amount of 30 g/m$^2$ in the terms of a solid to produce a thread-reinforced gummed tape.

EXAMPLE 3

A piece of kraft paper (50 g/m$^2$) was prepared as a lower paper layer 11. An acrylic emulsion pressure sensitive adhesive (a copolymer of acrylic ester and a monomer containing a carboxyl group) soluble in an aqueous alkali solution was applied as a laminating adhesive 12 onto the lower paper layer 11, so that it amounted to 25 g/m$^2$ in the terms of a solid. Water-soluble reinforcing threads (Solvron SL type) 14 were placed onto a top surface of the adhesive at distances of 10 mm in width-wise and flow-wise directions, as in Example 2 and further, a piece of "Culpak" paper (50 g/m$^2$) was placed thereon to form an upper paper layer 13. The resulting material was subjected to a press drying to provide a thread-reinforced tape base material 15. A gummed tape moisture activated adhesive (a mixture of dextrin and polyacrylic acid) 16 was applied onto the tape base material 15 in an amount of 30 g/m$^2$ in the terms of a solid to produce a thread-reinforced gummed tape.

COMPARATIVE EXAMPLE 2

A piece of kraft paper (50 g/m$^2$) was prepared as a lower paper layer. A water-insoluble vinyl acetate-based adhesive (Mowinyl 181E made by HOECHST GOSEI Corp.) was applied as a laminating adhesive onto the lower layer paper, so that it amounted to 20 g/m$^2$ in the terms of a solid. Glass threads and polyester threads were placed onto a top surface of the adhesive at distances of 10 mm, the former in a width-wise direction and the latter in a flow-wise direction, respectively, and further, a piece of "Culpak" paper (50 g/m$^2$) was placed thereon to form an upper paper layer. The resulting material was subjected to a press drying to provide a thread-reinforced tape base material. A gummed tape moisture activated adhesive (a mixture of dextrin and polyacrylic acid) was applied onto the tape base material in an amount of 30 g/m$^2$ in the terms of a solid to produce a thread-reinforced gummed tape.

Then, the thread-reinforced paper sheet as well as the thread-reinforced gummed tape in each of Examples as well as each of Comparative Examples was subjected to a strength test to provide results as given in Table 1 below.

The strength test was carried out using a test piece having a size of 50 mm × 150 mm to measure the tensile strength and elongation (%) under a condition of a tension speed of 200 mm/min by a universal tension and compression testing machine.

TABLE 1

| Example No. | Tensile strength (kg/50 mm) | | Elongation (%) | |
| --- | --- | --- | --- | --- |
| | Longitudinal | Lateral | Longitudinal | Lateral |
| Example 1 | 58 | 34 | 2.8 | 8.3 |
| Comparative Example 1 | 57 | 32 | 3.3 | 9.0 |
| Example 2 | 53 | 29 | 3.2 | 8.4 |
| Example 3 | 54 | 30 | 3.7 | 8.9 |
| Comparative Example 2 | 50 | 32 | 2.8 | 9.5 |

As apparent from Table 1, it was confirmed that the thread-reinforced paper sheets in Example 1 and Comparative Example 1 as well as the thread-reinforced gummed tapes in Examples 2 and 3 and Comparative Example 2 had an equivalent strength.

The disintegratability comparing test was carried out for the thread-reinforced paper sheet as well as the thread-reinforced gummed tape in each of the above-described Examples as well as each of the above-described Comparative Examples. More specifically, 16 g of each of the thread-reinforced paper sheets and the thread-reinforced gummed tapes was cut into a size of about 1 cm square. The cut piece was thrown into 150 ml of water, and sodium hydroxide was added thereto in an amount corresponding to 3% based on the weight of the cut piece. The resulting solution containing the cut piece was heated and boiled for 30 minutes. Then, water was added, so that the total volume was one liter. The resulting material was stirred for one minute by a house-service mixer to effect a disintegration. This disintegrated solution was used to make a regenerated paper. As a result, with each of the thread-reinforced paper sheets and the thread-reinforced gummed tapes in Comparative Examples, both of the laminating adhesive and the reinforcing threads were not disintegrated. More specifically, the adhesive remained swelled, and the reinforcing threads remained in their original states. In contrast, with each of the thread-reinforced paper sheets and the thread-reinforced gummed tapes in Examples, both of the adhesive or the pressure sensitive adhesive and the reinforcing threads were completely dissolved and excellent in disintegratability. In addition, the regenerated paper which was thus produced was satisfactory.

Industrial Applicability

As discussed above, according to the present invention, a regeneratable thread-reinforced paper sheet as well as a regeneratable thread-reinforced gummed tape is provided which exhibits a strength equivalent to that of the prior art article and moreover, has a complete disintegratability.

What is claimed is:

1. A thread-reinforced paper sheet comprising upper and lower paper layers, and a reinforcing thread interposed between said upper and lower paper layers, wherein said upper and lower paper layers are laminated to each other by using a water-soluble or water-dispersible adhesive, and the reinforcing thread used is a water-soluble thread.

2. A thread-reinforced gummed tape comprising a tape base material which consists of upper and lower paper layers and a reinforcing thread interposed between the upper and lower paper layers, and a moisture activated adhesive layer formed on one of surfaces of the tape base material, wherein said upper and lower paper layers are laminated to each other by using a water-soluble or water-dispersible adhesive, and the reinforcing thread used is a water-soluble thread.

* * * * *